United States Patent [19]
Colibert et al.

[11] Patent Number: 6,024,372
[45] Date of Patent: Feb. 15, 2000

[54] FIFTH WHEEL EXTENSION ADAPTER

[76] Inventors: Floyd A. Colibert, 2995 W. 6620 South, West Jordan, Utah 84084; John D. Clarke, 5352 W. Impressions Way, Kearns, Utah 84118

[21] Appl. No.: 08/795,086

[22] Filed: Feb. 5, 1997

[51] Int. Cl.[7] .......................................... B60D 1/07
[52] U.S. Cl. ..................... 280/417.1; 280/416.1; 280/425.2; 280/441.2; 280/504; 280/901
[58] Field of Search ................. 280/433, 416.1, 280/417.1, 418.1, 425.2, 423.1, 441.2, 901, 504, 511

[56] References Cited

U.S. PATENT DOCUMENTS

| | | | |
|---|---|---|---|
| 2,838,324 | 6/1958 | Dalton | 280/433 |
| 3,881,749 | 5/1975 | Berends | 280/417.1 |
| 3,889,978 | 6/1975 | Kann | 280/417.1 |
| 5,160,157 | 11/1992 | Hubler | 280/423.1 |
| 5,165,714 | 11/1992 | Kaim | 280/433 |
| 5,240,270 | 8/1993 | Colibert | 280/417.1 |
| 5,344,172 | 9/1994 | Jaun | 280/433 |
| 5,482,310 | 1/1996 | Staggs | 280/477 |
| 5,784,213 | 7/1998 | Howard | 280/477 |

*Primary Examiner*—Daniel G. DePumpo
*Attorney, Agent, or Firm*—Lloyd W. Sadler

[57] ABSTRACT

An improved fifth-wheel extension adapter is described whose design provides the adaptability necessary for mating of the extension adapter with all known trailer king pin designs, which further provides improved contact with the trailer king pin and which provides structure for visually observing the relative position of the extension adapter and the hitch assembly located in the bed of the towing vehicle. The fifth-wheel extension adapter comprises a vertical column, a bottom portion designed to releasably connect to the hitch assembly and a top portion designed to adjustably mate to a wide range of trailer king pin designs. The fifth-wheel extension adapter is further designed to be easily attachable and easily removable permitting the operator maximum flexible use of the towing vehicle as well as the ability, with only one extension adapter to tow the widest variety of fifth-wheel trailers. An additional improvement included within this invention is a mirror attachment which provides the structure for the operator to observe and guide the extension to mate with the hitch assembly.

5 Claims, 5 Drawing Sheets

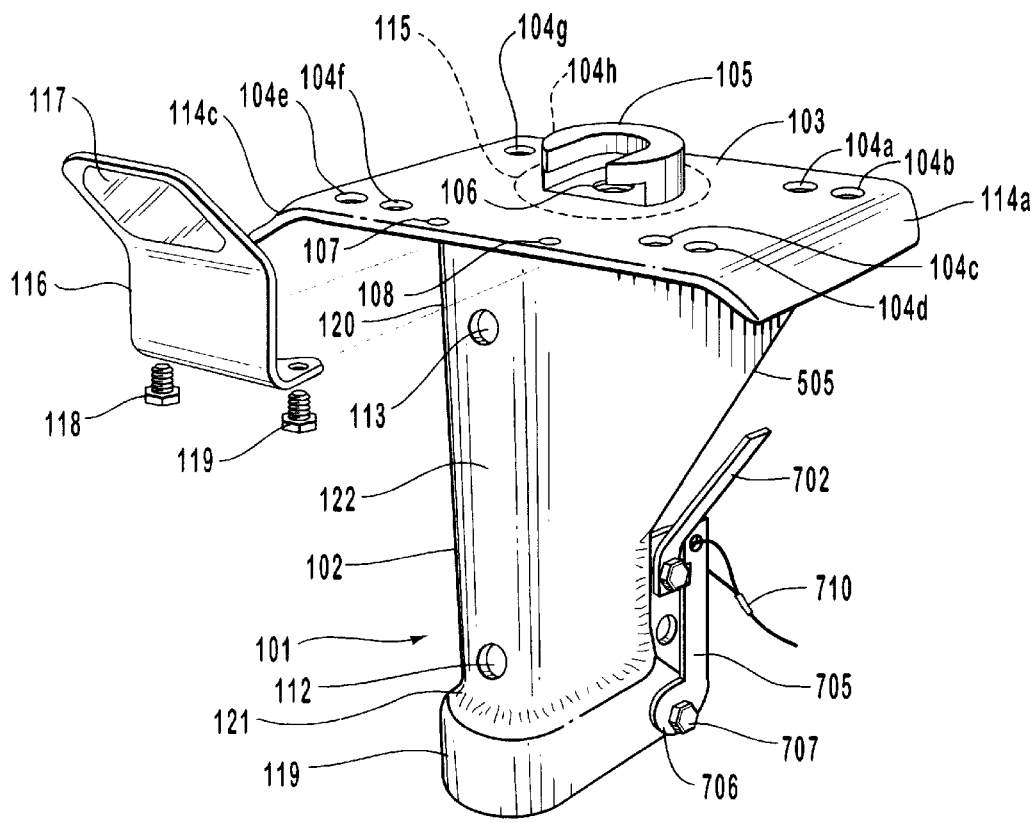
FIG. 1
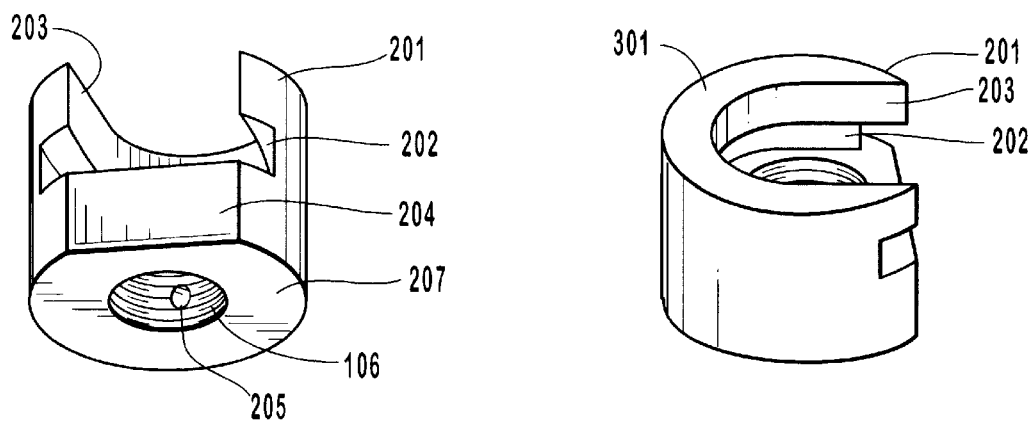
FIG. 2
FIG. 3

FIFTH WHEEL EXTENSION ADAPTER

BACKGROUND OF THE INVENTION

1. Field of the Invention

This invention relates to apparatuses for the coupling of towed vehicles to lead vehicles. Specifically, this invention relates primarily to removable temporary extension adapters to convert a fifth-wheel trailer hitch to a goose neck hitch. Furthermore, this invention permits a lead vehicle to pull a fifth-wheel trailer via a ball hitch which is securely attached to the truck, or other similar lead vehicle, bed level. This invention is an extension adapter that is easily removable, permitting a user to remove the hitch from the lead vehicle bed, when the hitch is not needed, thereby freeing the vehicle bed for other use. Moreover, this invention provides important improvements to the current fifth-wheel hitch art, including: fully adjustable, to fit all known king pin designs; being easily removable; and incorporating an aid for the driver's guidance of the ball and coupler.

2. Description of Related Art

Fifth-wheel trailers are generally large, high profile trailers. They are typically coupled to a lead vehicle, usually a pick-up or flat-bed truck, by a fifth-wheel connector assembly which is mounted on a frame within the bed of the truck so that the fifth-wheel connector is disposed in a plane above that of the bed of the truck. Most such couplers are secured to the bed of the truck. Such permanent attachment of the coupler is problematic when the truck bed is needed for other purposes, such as cargo loading or camper carrying. A typical coupled hitch is not desirable since the connector assembly and frame usually take up a significant amount of space. Moreover, the removal of the assembly and frame from the bed of truck typically requires an inordinate amount of time and effort.

Applicant is aware of only one prior art apparatus or device by which a conventional fifth-wheel trailer can be coupled to a standard ball hitch assembly mounted in the bed of the truck, where the apparatus can be easily and quickly installed or de-installed, that is U.S. Pat. No. 5,240,270 issued to Colibert. This invention provides significant and important improvements over U.S. Pat. No. 5,240,270, specifically this invention is fully adjustable to fit all known trailer pins, this invention has a top connecting plate shaped to better fit and cup the fifth-wheel trailer pin and fifth-wheel trailer pin housing, and this invention provides a mirror attachment to aid in the driver's alignment of the invention to the truck bed ball attachment.

Applicant is unaware of any related art apparatus or device that incorporates the features of this fifth-wheel trailer extension adapter. This invention fills the need of a fifth-wheel extension adapter that is adjustable to fit all known trailer pins and that is designed to permit the easy alignment of the extension adapter to the truck bed ball coupler by the truck driver. This invention eliminates the need for a custom, dedicated, nearly permanent trailer hitch which would typically work with only one of many types of trailer pins and which requires the exclusive use of the truck bed for the trailer hitch.

For general background material, the reader is directed to U.S. Pat. Nos. 2,475,878, 3,164,399, 3,390,896, 3,527,476, 3,788,673, 4,266,797, 4,320,907, 4,832,358, 5,058,915, and 5,240,270. Each of the above references is hereby incorporated by reference in its entirety for the material disclosed therein.

SUMMARY OF THE INVENTION

It is desirable to provide a fifth-wheel trailer hitch extension adapter that is adaptable to fit all known fifth-wheel trailer hitch pins. It is also desirable to provide a fifth-wheel trailer hitch extension adapter that incorporates a means for aiding the driver in lining up the ball and the coupler. Furthermore, it is desirable to provide a fifth-wheel trailer hitch extension adapter that is designed to be easily removable thereby freeing the bed of the towing vehicle for other uses.

Accordingly, it is the primary object of this invention to provide a fifth-wheel trailer extension adapter for coupling a fifth-wheel trailer to a ball hitch assembly, that is mounted in the bed of a vehicle, where the extension adapter is easily adaptable to fit to all known fifth-wheel trailer king pins.

It is a further object of this invention to provide a fifth-wheel extension adapter that incorporates a means for assisting the driver in lining up the coupler to the ball hitch assembly.

A further object of this invention is to provide a fifth-wheel extension adapter that incorporates design features which permit improved mounting to the trailer king pin box.

It is a still further object of this invention to provide a fifth-wheel extension adapter which can be installed and removed easily and efficiently.

It is a further object of this invention to provide a fifth-wheel extension adapter which attaches temporarily at one end to a standard ball hitch assembly in the bed of a vehicle and which temporarily attaches at the opposite end to the fifth-wheel trailer.

A further object of this invention is to provide a fifth-wheel extension adapter which is economical to manufacture, relatively inexpensive to purchase, easy to install, efficient, durable, and long lasting.

These and other objectives of this invention are achieved by this invention which comprises, in its preferred embodiment, a generally curved extension frame constructed of a structural material such as steel and including a first and a second coupling means. The first coupling means releasably connects the extension frame to a standard ball hitch assembly which is mounted in the bed of a vehicle, typically a pick-up truck or a flat bed truck.

The second coupling means connects the extension frame to a fifth-wheel trailer. This second coupling means is designed to permit a wide range of adjustments to accommodate the variety of fifth-wheel trailer king pins available in the industry. Furthermore, this adjustment means is designed to be easily adjustable and also to provide the necessary structural support for the trailer during the adjustment process.

The preferred first coupling means comprises a set of jaws that are openable so as to receive a standard ball type hitch and closable about the ball type hitch, and a hinged cap which may be moved into position over the closed jaws to maintain the jaws in a closed position, thereby assuring that the ball hitch remains enclosed and held within the jaws. Other alternative coupling means could be substituted, which would fall within this invention. Advantageously, the jaws and the cap of this first coupling means may be operated from a position remote from the bed of the vehicle so as to permit the operator to attach or detach the fifth-wheel extension remote from the bed of the towing vehicle.

The second coupling means, in the preferred embodiment, comprises a generally flat generally rectangular plate which has three of its four edges angled downward to permit improved fitting with the trailer king pin box. The plate includes an opening to receive the trailer king pin. Within the opening in the plate is an adjustable mechanism for clamping around king pins of a variety of dimensions. The adjustment mechanism is provided with a guide support screw, which in combination with a urethane spacer will support the entire system during installation. It is this adjustment mechanism that is the heart of this improvement invention. The plate also includes a number of bolt holes for attaching the trailer's king pin box to the extension adapter and a pressed cup ring which insures that contact with the extended perimeter surface of the plate is maintained and that no vertical movement is allowed between the plate and the fifth-wheel trailer.

Finally, the plate includes a mounting for a mirror support. With the mirror support in place, the driver is able to see, from the vehicle mirrors, the alignment of the extension adapter to the ball hitch, thereby aiding a driver in mating the fifth-wheel trailer to the vehicle.

BRIEF DESCRIPTION OF THE DRAWINGS

FIG. 1 is a perspective view of the extension adapter invention.

FIG. 2 is a front view of the king pin lock.

FIG. 3 is a side view of the king pin lock.

DETAILED DESCRIPTION OF THE INVENTION

Figure 4:
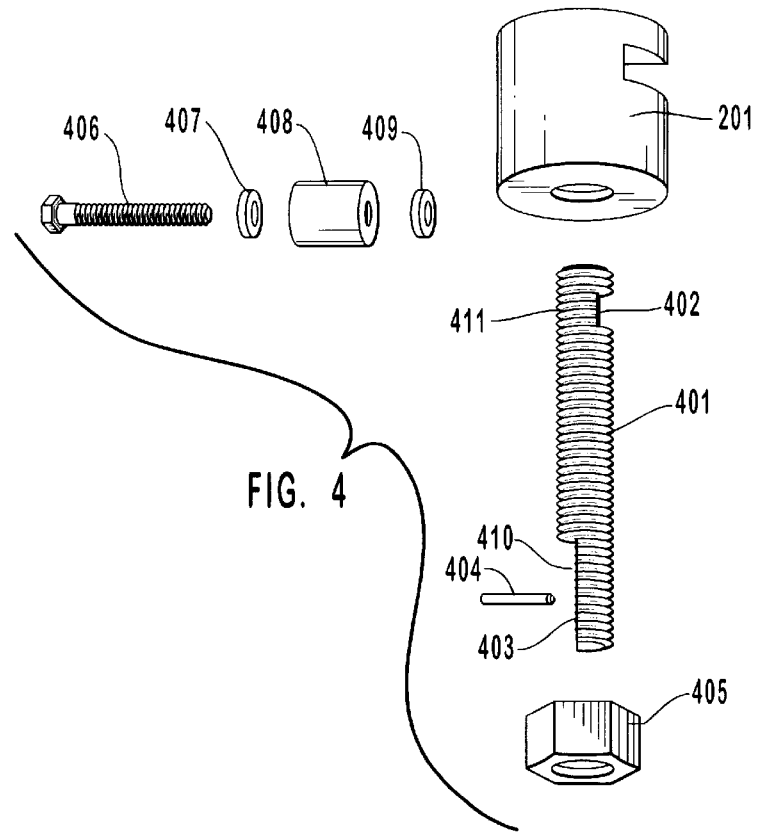
FIG. 4 is a break-away view of the component parts of the king pin lock assembly.

FIG. 1 shows the detachable extension adapter invention 101, designed to convert a fifth-wheel trailer 901 to a gooseneck trailer, permitting the acceptance of the ball hitch 903 at bed level in the towing vehicle 902. The extension adapter 101 is composed of a vertical column 102, a top portion 103 and a ball coupler assembly 119.

The vertical column 102 provides extended structural support between the fifth-wheel trailer 901 and the ball hitch assembly located in the bed of the towing vehicle 902. The vertical column 102 is preferably made of quarter inch plate structural steel formed to a 180 degree columnar shape, or a shape which is somewhat similar thereto, with two gussets 505 and 506 formed at the back side 122 of the vertical column 102. The gussets 505 and 506 strengthen the extension adapter 101 and facilitate its attachment to the fifth-wheel trailer 901. Two set up holes 112 and 113 are provided for use in forming the vertical column 102 shape. The vertical column 102 has a top end 120 and a bottom end 121.

The top end 120 of the vertical column 102 is attached to the top portion 103. The top portion 103 serves as a top connecting plate for connecting to the king pin box 905. In the preferred embodiment of the invention, the top portion 103 is welded to the top 120 of the vertical column 102. The top portion 103 is composed of ⅜ths inch plate A36 steel, approximately 11½ inches by 14 inches, with three of the edges 114a, 114b, and 114c formed to approximately a 45 degree angle. The bending of these edges 114a, 114b, and 114c is provided to improve the fit to the king pin box 905. Mounting holes 104a–h are provide to accommodate bolts (not shown) which serve to further secure the extension to the king pin box 905. In the preferred embodiment of the invention, the mounting holes 104a–h are designed for ½ inch grade 8 bolts to be installed one in each corner. Two mounting holes 104a–h are provided in each corner to provide flexibility in attaching to the king pin box 905.

The novel adaptable locking system which is the heart of the invention is shown 105. The locking system 105 is adjustable permitting the lock 105 to protrude as much as 1⅜ths of an inch or sufficient to permit the insertion of the king pin into the locking system 105. Within the lock 105 is a threaded section 106 for an all-threaded support screw 401 to attach at its bottom end to a support nut 405. As the support nut 405 is turned it draws the lock 105 and the king pin straight down vertically into the vertical column 102.

Also provided, to maintain contact with the king pin box 905 to the top portion 103 is a cupping indentation 115. This cupping indentation section 115 serves to maintain contact of the outer perimeter of the top portion 103 with the trailer king pin box 903. The cupping indentation 115 is generally five inches in diameter, centered about the lock 105. The cupping indentation 115 causes an oil can or compression effect, eliminating the need of a lock washer above and to support the support screw nut 405.

The top portion 103 is also provided with mounting holes 107 and 108 for mounting the mirror bracket 116 by bolting the mirror bracket bolts 118 and 119 through the mirror bracket 116 to the top portion 103. The mirror bracket 116 provides an attachment point for a convex mirror 117. The convex mirror 117 is provided to give the operator a line of sight from the driver's seat, through the towing vehicle's 902 rear view mirror to the ball hitch 903 as it enters the coupler 119 and in this way aids the operator in aligning the vehicle 902 to the coupler 119.

FIG. 2 is a front view of the king pin lock 201 portion of the locking system 105. In the preferred embodiment of the invention the king pin lock 201 is composed of 3¾ inch diameter by 3 inches long cold finish steel. A notch 202 is provided to accept the lower lip of the king pin from the trailer 901. A machined U-shaped curve 203 is formed in the top of the king pin lock 201 to accept the 2 inch machined section of the king pin. A flat section 204 is provided. This flat section 204 is machined to a dimension of approximately 30 to 50 thousandths over the entire surface of the king pin lock 201, allowing the king pin to be drawn tightly into the king pin lock hole in surface of the top portion 103, with some small clearance but not allowing it any excessive play or rotational movement. A threaded set screw hole 205 is provided to allow access to the support screw 401 to a set screw 406. By cinching to a flat area 402 via the set screw hole 205, the set screw 406 keeps the support screw 401 from turning, thereby maintaining the support screw 401 at the required adjustment within the vertical column 102. The bottom 207 of the king pin lock 201 is machined smooth, generally flush, true and square with a slight taper towards the bottom edges to allow a smooth operation of the 201 king pin lock.

FIG. 3 is the side view of the king pin lock 201 which shows an alternative view of the king pin lock 201. Top surface 301 is machined smooth, with a slight taper around the top surface edge to allow smooth adjustment of the 201 king pin lock.

FIG. 4 is a break-away view of the component parts of the king pin lock assembly 105. The support screw 401 is inserted in the bottom to the lock 201. Support nut 405 is installed on the bottom of support screw 401 to draw the lock 201 and the trailer king pin downward, through the top portion 103, into the vertical column 102 to secure the king pin box 905 on the fifth-wheel trailer 901 to the extension 101. A roll pin 404 is inserted through a hole (not shown) in the lower portion 403 of the support screw 401 to retain the support screw nut 405 above the roll pin 404. Flat portions 402 and 410 are provided on the opposite side of the top 411 and the bottom 403 of the support screw 401, respectively. The flat portions 402 serves to lock the support screw 401 in place, via the set screw 406 and the flat portion 410 serves to permit the support screw 401 to clear the spring and shaft 503.

In the preferred embodiment of the invention, the set screw is a ⅜ths" by 3" standard screw, inserted through washer 407, urethane plug 408, washer 409, slot 501, setting into set screw hole 205 to support the king pin lock 201 and to prevent it from turning the locking screw 401 when the support nut 405 is tightened. A urethane plug 408 is used because under pressure it serves as a brake and supports the entire detachable extension 101 while the extension 101 is being installed on the king pin box 905. The support function provided by the urethane plug 408 permits the operator to reach into the back of the extension 101 and spin the support screw nut 405 up until it brings the support screw 401 down into the vertical column 102 and with it the king pin within the king pin lock 201. Otherwise, without the urethane plug 408, the operator would be required to support the entire weight of approximately 60 to 65 pounds while spinning up the support screw nut 405. Currently, the best mode of the invention employs 90 durometer urethane for the urethane plug 408. The urethane plug 408 serves as a type of a spring, providing adjustable pressure to support the entire system 101. The spring tension of the urethane plug 408 can be adjusted downward by cutting or grinding off a little of it. Using a longer urethane plug 408 can add tension.

Figure 5:
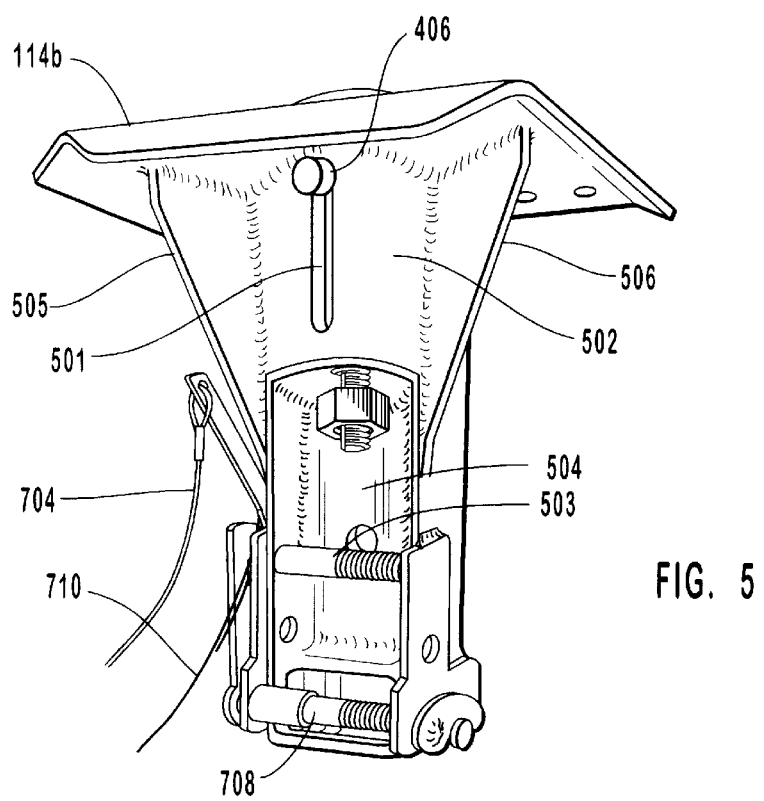
FIG. 5 is a rear elevation view of the extension adapter of FIG. 1, particularly showing the support screw, support screw nut and the guide support screw installed in the extension adapter invention.

FIG. 5 is a rear elevation view of the extension adapter of FIG. 1, particularly showing the support screw, support screw nut and the guide support screw installed in the extension adapter invention, through the slot 501 as previously described. The slot 501 is essentially narrow and runs vertically in the vertical axis of the vertical column 102 so that the king pin can be slid up and down as the king pin lock is adjusted for depth but is restrained from moving horizontally, thereby preventing the lock system 105 from turning. A curved portion 502 is provided, in which the slot 501 runs, to be a guide track plate for the adjustable king pin lock 201. In the preferred embodiment of the invention a support nut 405 gusset 504 is provided to give internal structural support to the extension 101.

Figure 6:
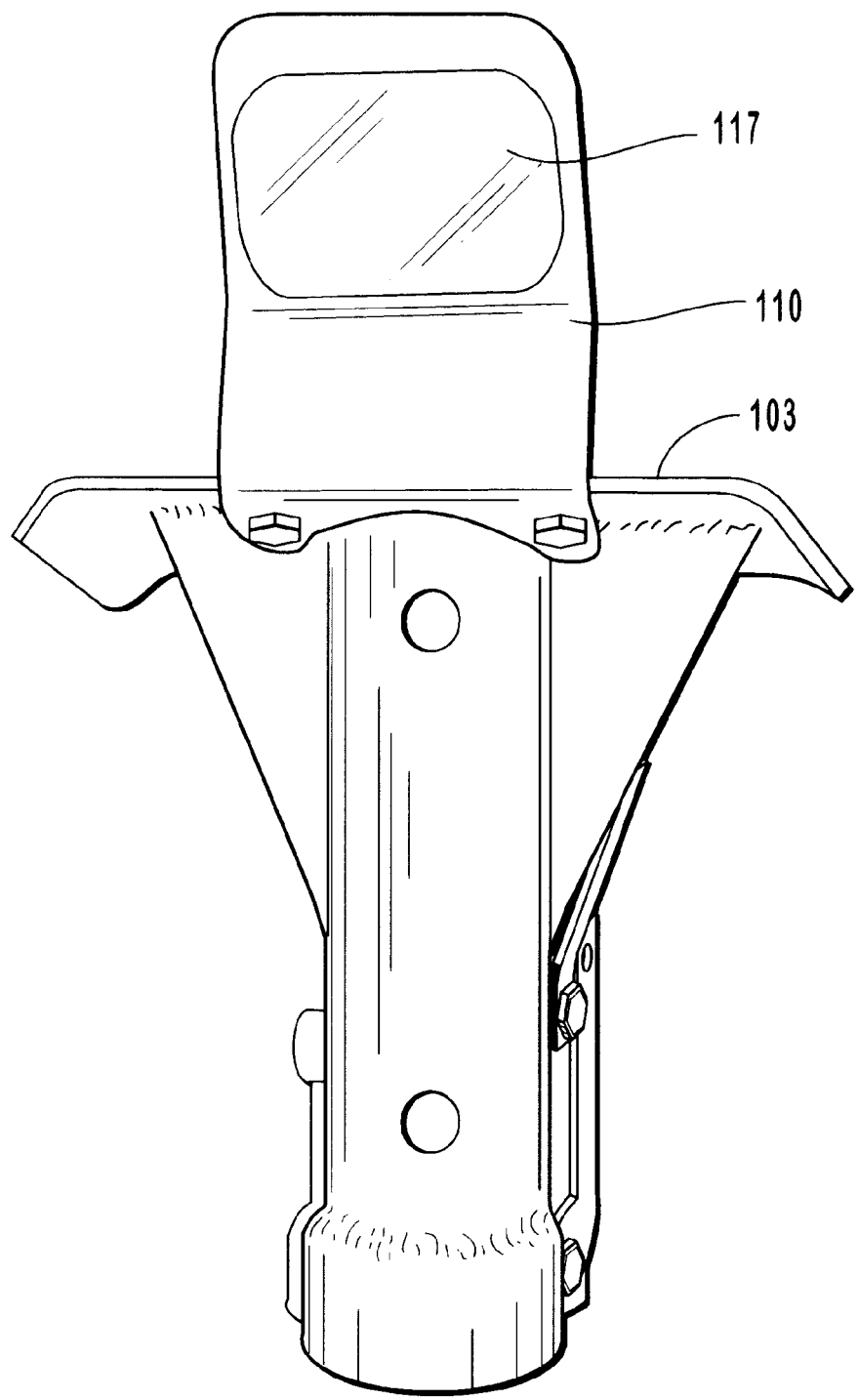
FIG. 6 is a front elevation view of the extension adapter of FIG. 1 showing set-up guide holes and particularly the mirror and mirror attachment.

FIG. 6 is a front elevation view of the extension adapter of FIG. 1 showing set-up guide holes and particularly the mirror and mirror attachment installed on the top portion.

Figure 7:
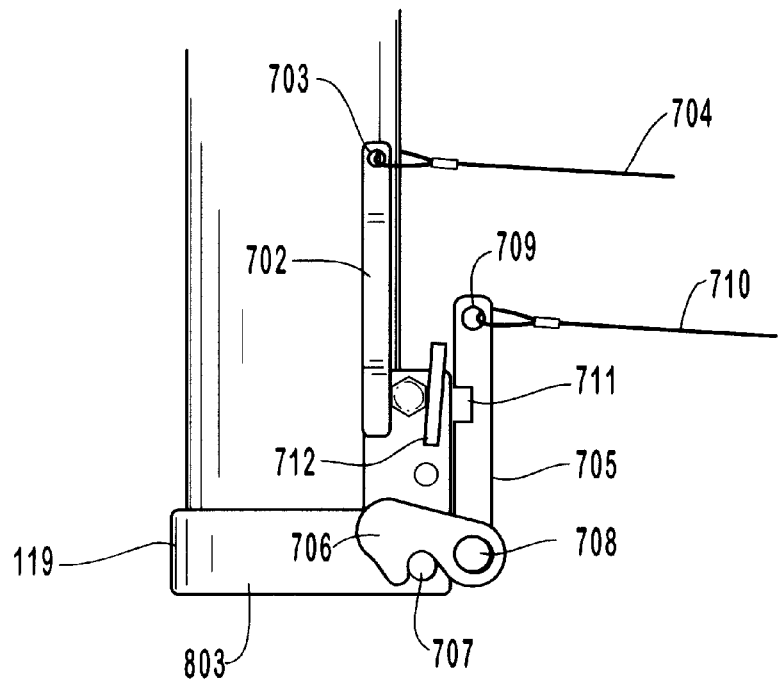
FIG. 7 is a side elevation view of an an additional feature of the extension adapter invention showing the cap being drawn over the closed ball hitch engaging jaws.
Figure 8:
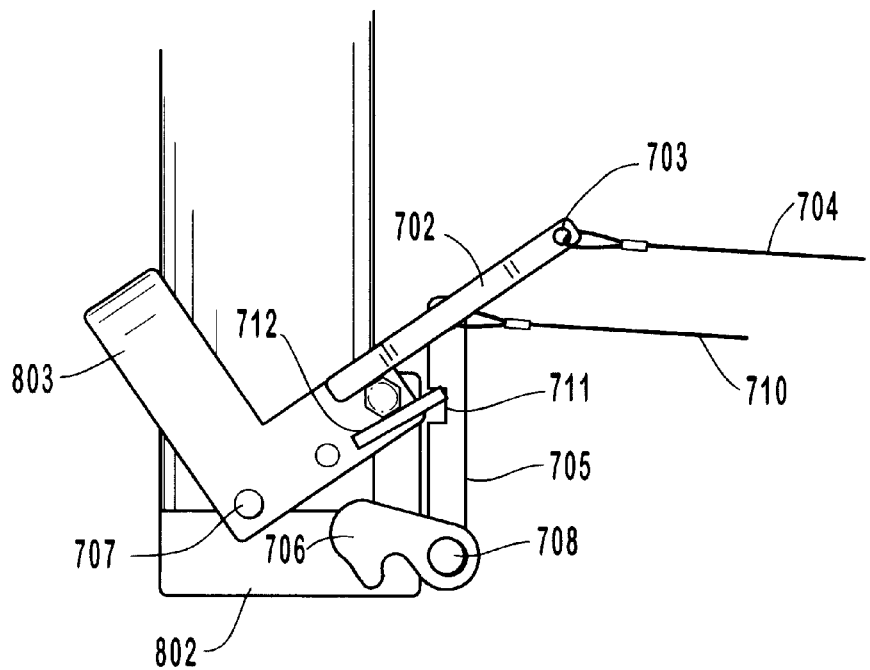
FIG. 8 is a side elevation view of an alternative embodiment of the extension adapter invention showing the cap in an open jaw releasing position.

FIG. 7 is a side elevation view of an an additional feature of the extension adapter invention showing the cap being drawn over the closed ball hitch engaging jaws, and FIG. 8 is a side elevation view of an alternative embodiment of the extension adapter invention showing the cap in an open jaw releasing position. FIGS. 7 and 8 are provided to show the detailed operation of the ball coupler assembly 119. As noted above, the bottom end 121 of the vertical column 102 is attached to the ball coupler assembly 119. The ball coupler assembly 119 is standard in the industry, except as hereafter explained. Trailer Equipment Manufacturing of Menden, La. manufactures the "AUTOLOCK" coupler, which is suitable for use as the ball coupler assembly 119 in this invention. The ball coupler assembly 119 attached to the bottom end 121 of the vertical column 102 comprises essentially a set of jaws 802 being moveable between an open position whereby a standard ball type hitch may be inserted therein and a closed position whereby the ball type hitch is securely held therein, and a hinged cap 803 which can be drawn over the set of jaws 802 when the set of jaws 802 are closed to ensure that the ball type hitch remains rotatably secured therein.

The ball coupler assembly 119 is moveable between the open position and the closed position from an operating system that is remote from the ball coupler assembly's 119 location. This feature is important because it provides the means for an operator to fasten the detachable extension adapter 101 to the ball hitch 903 installed in the bed of the towing vehicle 902 from the rear of the vehicle. In the current best mode of the invention, the remote operation is facilitated, as shown in FIGS. 7 and 8, by a first lever 702 which is attached at one end to the hinged cap 803. The opposite end of the hinged cap 803 has an aperture 703 through which a looped connector line 704 is securely attached. The looped connector line 704 leads to the remote operating location. As the hinged cap 803 is biased in the closed position, an operator in a remote operating location pulls on the connector line 704 and the hinged cap 802 is raised to the open position.

A second lever 705 may be used in conjunction with a locking hook 706 to prevent the raising of the hinged cap 803 from the closed position to the open position. In the closed position, the locking hook 706 is hooked about an outwardly extending peg 707, which is integrally attached to the hinge cap 803. The second lever 705 and corresponding locking hook 706 are biased downwardly in the locked position. Thus, in the closed position, the hinged cap 803 surrounds the closed set of jaws 802 which encompass the ball hitch assembly 903 disposed in the bed 904 of the towing vehicle 902. Because the hinged cap 803 is locked in place, little or no likelihood exists that the jaws 802 will release prematurely when pulling a fifth-wheel trailer 901.

Furthermore, the second lever 705 is rigidly attached at one end to the locking hook 706, the second lever 705 and the locking hook 706 being rotatably mounted on a shaft or axle 708 which is securely attached to the coupler 109. The opposite end of the second lever 705, similar to the first lever 702, includes an aperture 709 through which a looped connector line 710 is securely attached. The looped connector line 710 leads to the remote operating location mentioned above in connection with looped connector line 704. The second lever 705 includes a notch 711, which is located at the approximate middle point between the two ends of the second lever 705. Further, a tab 712 is welded or otherwise securely attached to the hinged cap 803 such that when the looped connector line 710 is pulled by an operator at the remote operating location, and the hinged cap 803 is raised to the open position responsive to the operator pulling on the looped connector line 704, the tab 712 engages the notch 711 to prevent the hinged cap 803 from closing. When the hinged cap 803 is to be closed, after the ball hitch assembly 903 is placed within the jaws 802, a slight pull on the looped connector line 710 disengages the tab 712 from the notch 711, thus allowing the hinged cap 803 to move to the closed position when the jaws 802 are closed. When the jaws 802 are open, the cap 803 rests upon them after disengagement of the tab 712 from the notch 711. The cap 803 automatically moves to the closed position upon closure of the jaws 802. One skilled in the art will recognize that the provision of the first lever 702 and the second lever 705, and the looped connector lines 704 and 710 provide the operator the advantage of moving the hinged cap 803 between the opened and closed positions without having to climb into the bed 904 of the towing vehicle 902.

Figure 9:
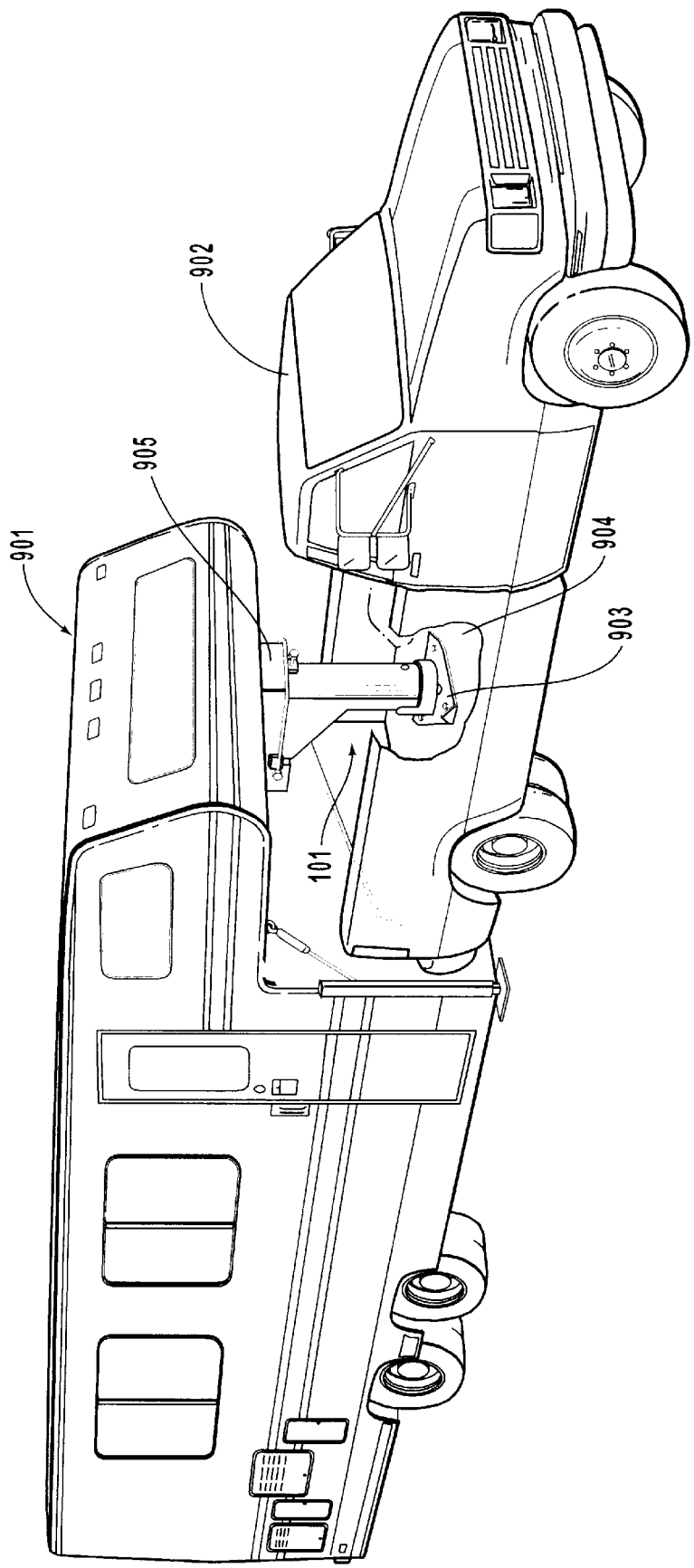
FIG. 9 is a partial perspective view of an example of a fifth-wheel extension adapter according to the invention used with a conventional fifth-wheel trailer and pick-up truck.

FIG. 9 is provide to show the functional operation of the detachable extension adapter 101 installed as the adapter between a fifth-wheel trailer 901 and a typical pick-up truck 902. The extension adapter 101 is shown connecting the ball hitch assembly 903 and the king pin box 905.

It is to be understood that the above described embodiment of the invention is intended to provide the inventors' current best mode embodiment of the invention and is merely illustrative of the numerous and varied other embodiments which may constitute applications of the principles of the invention. Such other embodiments may be readily devised by those skilled in the art without departing from the spirit or scope of this invention and it is the intent of the inventors that such other embodiments be deemed within the scope of this invention. The scope of this invention is indicated by the appended claims, rather than by the foregoing description. All changes which come within the meaning, scope and range of equivalency of the claims are to be embraced as within the range of the protection of this invention.

What is claimed is:

1. A fifth-wheel extension adapter for coupling between a trailer king pin and a hitch assembly which is mounted in the bed of a towing vehicle, comprising:

(A) an extension frame having a top end and a bottom end;

(B) a first coupler mechanically attached to said bottom end of said extension frame for connecting to said hitch assembly and having a first lever attached at a first end to said first coupler and a second end attached to a connector line which provides a remote disconnect of said first coupler; and (C) a second coupler mechanically attached to said top end of said extension frame adapted to be permanently fixed to the trailer king pin, wherein said second coupler further comprises a vertical adjustment having a king pin lock fixed to a threaded support screw which has a support nut positioned on said threaded support screw, wherein said king pin lock can be adjusted in its vertical position within said extension frame by turning said support nut to accommodate trailer king pins of a variety of lengths.

2. A fifth-wheel extension adapter as recited in claim 1 wherein said threaded support screw further comprises a first flat portion, and said second coupler further comprises a weight support mechanically attached to said king pin lock for supporting the weight of said extension adapter while said extension adapter is being adjusted to fit the trailer king pin.

3. A fifth-wheel extension adapter as recited in claim 2 wherein said weight support further comprises:

(a) a set screw inserted into said king pin lock and in contact with said first flat portion of said threaded support screw; and (b) a plug through which said set screw is fixed, wherein said plug has compressibility and expansion properties that can be adjusted to provide varying degrees of tension to provide varying degrees of weight support.

4. A fifth-wheel extension adapter for coupling between a trailer king pin and a hitch assembly which is mounted in the bed of a towing vehicle, comprising:

(A) a bottom portion, for connecting to the hitch assembly;

(B) a substantially columnar portion attached to said bottom portion; and (C) a top portion attached to said substantially columnar portion, adapted to be permanently fixed to the trailer king pin, said top portion, further comprising a generally flat portion, with an king pin lock hole for receiving said trailer king pin, having an edge which curves downward away from said generally flat portion to permit an improved fit to the trailer king pin and having a lock, within said king pin lock hole, fixed to a threaded support screw which has a support nut positioned on said threaded support screw, wherein said lock can be adjusted in its vertical position within said extension frame by turning said support nut, said lock mechanically adapted to receive said trailer king pin.

5. A fifth-wheel extension adapter as recited in claim 4 wherein said top portion further comprises a center area surrounding said king pin lock hole and an indentation, said indentation being generally positioned within said center of said top portion for the purpose of improving fit between said fifth-wheel extension adapter and the trailer king pin.

* * * * *